(12) United States Patent
Chander et al.

(10) Patent No.: US 6,850,492 B2
(45) Date of Patent: Feb. 1, 2005

(54) METHOD AND SYSTEM FOR ENABLING A ROUTE AND FLOW TABLE UPDATE IN A DISTRIBUTED ROUTING PLATFORM

(75) Inventors: Vijay K. Chander, Livermore, CA (US); Atul B. Mahamuni, San Jose, CA (US); Ramkumar Sankar, Santa Clara, CA (US); Sreeram Iyer, Sunnyvale, CA (US); Henry Hong-Yi Tzeng, San Jose, CA (US)

(73) Assignee: Nokia Corporation, Espoo (FI)

( * ) Notice: Subject to any disclaimer, the term of this patent is extended or adjusted under 35 U.S.C. 154(b) by 61 days.

(21) Appl. No.: 10/302,709

(22) Filed: Nov. 22, 2002

(65) Prior Publication Data

US 2004/0100904 A1 May 27, 2004

(51) Int. Cl.[7] .................................................. H04J 3/14
(52) U.S. Cl. ................... 370/235; 370/395.31; 370/396
(58) Field of Search .............................. 370/235–240, 370/389, 390, 328, 338, 396, 400, 401, 395.3, 395.31, 395.32; 709/201, 238, 242

(56) References Cited

U.S. PATENT DOCUMENTS

| | | | | |
|---|---|---|---|---|
| 5,517,620 A | * | 5/1996 | Hashimoto et al. | 709/242 |
| 5,802,316 A | * | 9/1998 | Ito et al. | 709/249 |
| 5,920,697 A | * | 7/1999 | Masters et al. | 709/219 |
| 6,052,718 A | * | 4/2000 | Gifford | 709/219 |
| 6,112,248 A | * | 8/2000 | Maciel et al. | 709/238 |
| 6,643,706 B1 | * | 11/2003 | Marques et al. | 709/242 |

* cited by examiner

Primary Examiner—Dang Ton
Assistant Examiner—Tri H. Phan
(74) Attorney, Agent, or Firm—Darby & Darby PC; John W. Branch

(57) ABSTRACT

A system and method is directed to updating a route table in a distributed routing platform, thereby enabling multiple routing protocols to be executed on different routing modules. A slave route distributor on one routing module is configured to receive a route from a local route table and flow manager. The slave route distributor communicates the route to a master route distributor on another routing module by way of an inter process communications protocol. The master route distributor provides the route to its local route table and flow manager, where a determination is made whether the route is a best route. If the route is a best route, the master route distributor updates its external routing table. The master route distributor also distributes the route to another slave route distributor on yet another routing module, where the route enables an update to a remote routing protocol, and routing table.

25 Claims, 6 Drawing Sheets

METHOD AND SYSTEM FOR ENABLING A ROUTE AND FLOW TABLE UPDATE IN A DISTRIBUTED ROUTING PLATFORM

FIELD OF THE APPLICATIONS

The present invention relates to networks, and more particularly to providing an update to a routing table in a distributed routing platform.

BACKGROUND OF THE INVENTION

With the tremendous growth of the Internet, enormous demands have been placed on network infrastructures. To address these demands, modern routers employ various routing architectures, including shared bus, parallel Central Processing Units (CPUs), interface CPUs, and crossbar switch architectures. Many of these architectures further employ a distributed approach, where the performance of routing functions is distributed among the router's main processing components and multiple intelligent line cards installed within the router. Each intelligent line card is typically configured to provide a routing protocol or routing protocols.

Generally, a distributed routing architecture is more scalable, and capable of providing more services than a router with a centralized architecture. Traditionally, this problem is solved by distributing the routing-tables to the intelligent line cards. However, as the number of routing-protocol packets directed to a particular routing protocol increase, a traditional distributed routing architecture becomes congested. Therefore, it is with respect to these considerations and others that the present invention is made.

SUMMARY OF THE INVENTION

The present invention is directed to addressing the above-mentioned shortcomings, disadvantages and problems, and will be understood by reading and studying the following specification.

The present invention provides a system and method directed to enabling an update to a routing table in a distributed routing platform by employing a master/slave route distributor architecture. The distributed routing platform operates as a router with the master and slave router distributors on separate nodes associated with the router.

In one aspect of the present invention, a method is directed to updating a route table in a router. The method receives a route on a given node. If the route is a best route, the method updates a local routing table with the best route. If this node includes a master route distributor, the method distributes the best route to at least one remote node in the router. The remote node is enabled to update a remote route table with the best route.

In another aspect of the present invention, a router includes a slave route distributor and a master route distributor. The slave route distributors are configured to receive a route associated with a local routing protocol. If the route is a best route, the slave route distributors update routing tables with the best route. The master route distributor is configured to receive the route from the slave route distributor, and distribute it to all other slave route distributors in the system. The other slave route distributors are configured to update their local routing tables.

In still another aspect of the present invention, an apparatus includes a Route Table and Flow Manager (RTFM) and a Route Distributor. The RTFM is configured to receive a route, and determine if the route is a best route. If the route is the best route, the RTFM updates the route table with the best route and feeds this route into the local route distributor. If the local route distributor is a master route distributor, it distributes the best route to a slave route distributor, where the slave route distributor is enabled to update the local route table with this best route.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
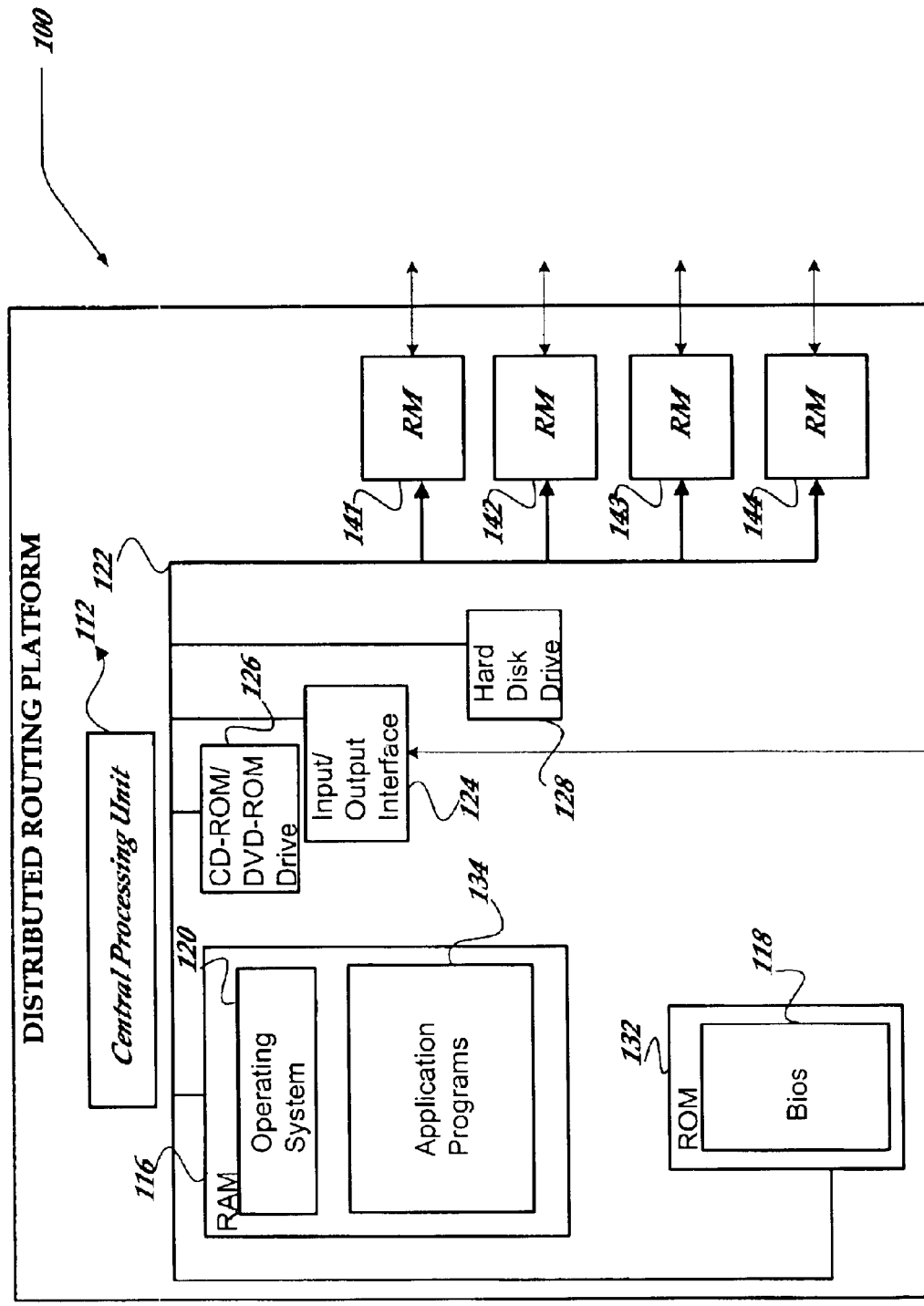
FIG. 1 illustrates a block diagram generally showing an overview of one embodiment of a distributed routing platform.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

A "distributed routing platform" means a computing device that is capable of performing services and network routing functions, where the performance of the services and functions are distributed among the platform's system control points and service-creation/routing points.

A "packet" means an arbitrary or selectable amount of data that may be represented by a sequence of one or more bits. A packet may correspond to a data unit found in a layer of the Open Systems Interconnect (OSI) model, such as a segment, message, datagram, frame, symbol stream, stream, and a combination of data units found in the OSI model or a non-OSI data unit.

The term "signal" means at least one control current signal, voltage signal, or packet control signal. The term "flow" refers to a flow of packets. The term "traffic" means a flow of at least one packet.

The term "node" means an intelligent component in the distributed routing platform that actively participates in the maintenance of the distributed route table.

The term "GDP" or "Generic Distribution Protocol" refers to a generic scheme of distributing information from one node to others. The implementation of the exact distribution protocol or inter-processor communication is outside the scope of this invention.

The term "FTM" means a Forwarding Table Manager. This term refers to a function in the distributed routing platform that manages the forwarding table, which is the actual table consulted for forwarding the IP packets received by the platform.

The terms "route", "flow" or "classification rule" refer to a rule or a set of rules for processing the packet based on the contents of the packets. This includes rules based on the IP destination address, and other fields (Layer-2 to Layer-7 information) in the packet.

The term "best route" refers to a set of routes selected for distribution. This selection is based one or more criteria such as local policies, shortest path, preferred path, and the like. These may or may not be the same as the most optimal routes for the system.

The meaning of "a," "an," and "the" include plural references. The meaning of "in" includes "in" and "on."

Additionally, a reference to the singular includes a reference to the plural unless otherwise stated or is inconsistent with the disclosure herein.

Briefly stated, the present invention is directed to a system and method for enabling an update to a route table in a distributed routing platform by employing a master/slave route distributor architecture across multiple nodes. The update to the routing table enables multiple routing protocols to be executed on different nodes, routing modules, intelligent line cards, and the like, across the distributed routing platform. In one embodiment, the distributed routing platform operates as a scalable router with multiple nodes. A slave route distributor on a first routing module is configured to receive a route from a local route table and flow manager. The slave route distributor communicates the route to the master slave route distributor on a second routing module by way of an interprocess communications protocol. The master route distributor provides the route to its local route table and flow manager, where a determination is made whether the route is a best route. If the route is a best route, the master route distributor updates its external routing table. The master route distributor also distributes the route to another slave route distributor on a third routing module, where the route enables an update to a remote routing protocol, and routing table. By distributing a route and its associated information across multiple routing modules on different nodes, the present invention facilitates scalability of available resources on a distributed routing platform operating as a router.

Illustrative Environment

FIG. 1 illustrates a block diagram generally showing an overview of one embodiment of a distributed routing platform. Distributed routing platform 100 may operate as a server, workstation, network appliance, router, bridge, firewall, gateway, a traffic management device, and the like. Distributed routing platform 100 may include many more components than those shown in FIG. 1. However, the components shown are sufficient to disclose an illustrative environment for practicing the present invention.

Distributed routing platform 100 may include processing unit 112 and a mass memory, all connected via bus 122. Bus 122 may provide inter process communications, employing a variety of protocols, including Generic Distribution Protocol (GDP). The mass memory generally includes random access memory ("RAM") 116, read-only memory ("ROM") 132, and one or more permanent mass storage devices, such as hard disk drive 128, a tape drive (not shown), optical drive 126, such as a CD-ROM/DVD-ROM drive, and/or a floppy disk drive (not shown). The mass memory stores application programs 134 and operating system 120 for controlling the operation of distributed routing platform 100. Operating system 120 may comprise a general-purpose, or special-purpose operating system including, for example, UNIX, LINUX™, or one produced by any of a variety of other operating system vendors. Basic input/output system ("BIOS") 118 is also provided for controlling the low-level operation of distributed routing platform 100.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, and other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Distributed routing platform 100 may also comprise input/output interface 124 for communicating with external devices, such as a mouse, keyboard, scanner, or other input devices not shown in FIG. 1. In some embodiments of the invention, distributed routing platform 100 does not include user input/output components. For example, distributed routing platform 100 may or may not be connected to a monitor. In addition, distributed routing platform 100 may or may not have input/output interface 124. For example, distributed routing platform 100 may implement a network appliance, such as a router, gateway, traffic management device, and the like, which is connected to a network and that does not need to be directly connected to user input/output devices. Such a device may be accessible, for example, over a network.

Distributed routing platform 100 also includes Routing Modules (RMs) 141–144. RMs 141–144 are described in more detail in conjunction with FIGS. 2–3. Briefly, however, RMs 141–144 contain the routing tables that direct the routing of Internet Protocol (IP) packets received by the platform. RMs 141–144 may be configured to perform one or more services on the data packets before routing them. RMs 141–144 may also be configured to perform the services or to forward the packets to another routing modules that performs the services. RMs 141–144 are further configured to provide routes, and routing protocol information, to each other, thereby enabling multiple routing protocols to be executed on different routing modules. RMs 141–144 may be a transport service module (TSM) providing a service-creation/transport point, a control processor (CP) card that maintains system-wide information, a routing engine (RE), and the like. Moreover, each RM may represent a separate node. In addition, each node may in turn be included in one or more line cards, and the like, within distributed routing platform 100. As discussed herein, distributed routing platform 100 operates as a scalable router, where each RM resides on a separate node associated with the scalable router.

In addition, RMs 141–144 include the necessary circuitry for connecting to networks, such as the Internet, local area networks, and the like. RMs 141–144 are configured to employ various communication protocols including the TCP/IP protocol, inter-node inter-process communications protocol including GDP, and may include or interface with circuitry and components for transmitting messages and data over a wired and/or wireless communications medium.

Although four RMs are illustrated in FIG. 1, the invention is not limited to four, and more or less RMs may be employed without departing from the scope or spirit of the present invention.

Figure 2:
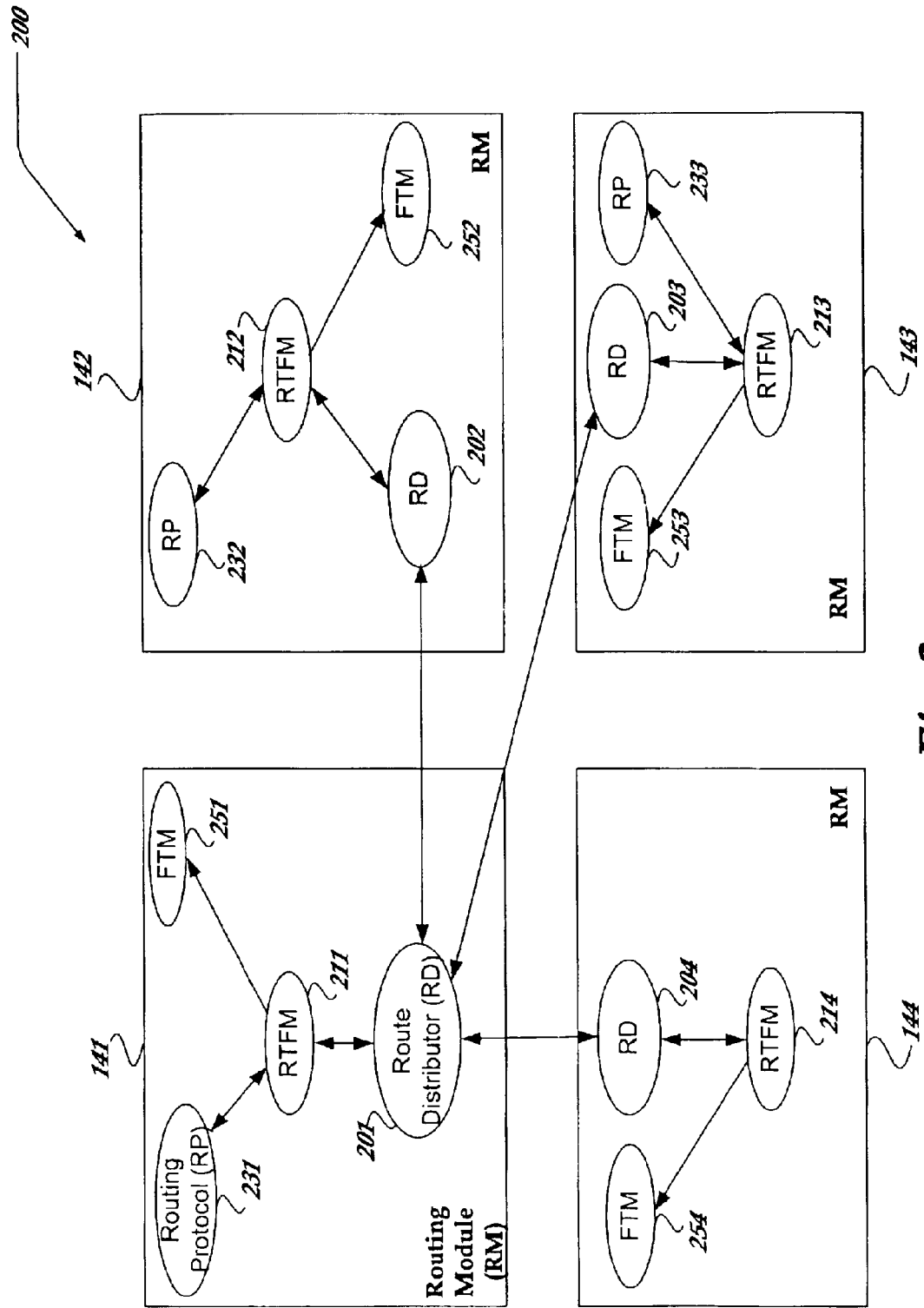
FIG. 2 illustrates a functional block diagram of one embodiment of four routing modules as shown in FIG. 1.

FIG. 2 illustrates a functional block diagram of one embodiment of four routing modules, such as shown in FIG. 1. As shown, routing system 200 includes RMs 141–144. RM 141 includes Routing Protocol (RP) 231, Forwarding Table Module (FTM) 251, Route Table and Flow Manager (RTFM) 211, and Master Route Distributor (MRD) 201. RM 142 includes RP 232, FTM 252, RTFM 212, and Route Distributor (RD) 202. RM 143 includes RP 233, FTM 253, RTFM 213, and RD 203. Moreover, RM 144 includes FTM 254, RTFM 214, and RD 204.

Distribution of the RTFMs and RDs across multiple RMs as shown in FIG. 2 is directed to minimizing congestion of route updates to Routing-Protocols through the scalable router.

RTFM 211 is in communication with RP 231, FTM 251, and RD 201. RD 201 is also in communication with RD 202–204. RTFM 212 is in communication with RP 232, FTM 252, and RD 202. RTFM 213 is in communication with RP 233, FTM 253, and RD 203. Additionally, RTFM 214 is in communication with FTM 254, and RD 204.

RPs 231–244 are configured to determine a routing protocol that enables an IP packet to be forwarded beyond a local segment across an internetwork to a destination. RMs 231–244 may employ a variety of routing protocols to determine a route, including, but not limited to directly connected interface protocols, static routing protocols, default routing protocols, and dynamic routing protocols such as Routing Information Protocols (RIPs), Open Shortest Path First (OSPF), Enhanced Interior Gateway Routing Protocol (EIGRP), Border Gateway Protocol (BGP), Intermediate System-to-Intermediate System (ISIS), and the like.

FTMs 251–254 are configured to map a route, route information, IP-flow information, and the like to the Forwarding Table consulted for forwarding the IP packets.

RTFMs 211–214 are configured to receive a route, route information, and the like, and to determine a best route based in part on the route. In one embodiment, at least one RTFM is pre-defined as a master RTFM, and the other RTFMs within the distributing routing platform are non-master RTFMs. RTFMs 211–214 are also configured to manage routing rules that enable routing of an IP packet. Such routing rules may specify services that are performed on certain classes of packets by RTFMs 241–244 and the ports to which the packets are forwarded. RTFMs 211–214 may employ a switch tag (not shown) to enable the distribution of packets, routing rules, routes, and the like to an RP, and RD. In one embodiment, RTFMs 211–214 employ a notification change list to communicate route and route information to the associated RD.

The master RTFM further includes a database (not shown) that is configured to store a global best route and associated route information, and a master-forwarding rule for distributed routing platform 100. Moreover, master RTFM may also manage identifiers associated with each routing protocol in distributed routing platform 100.

Figure 3:
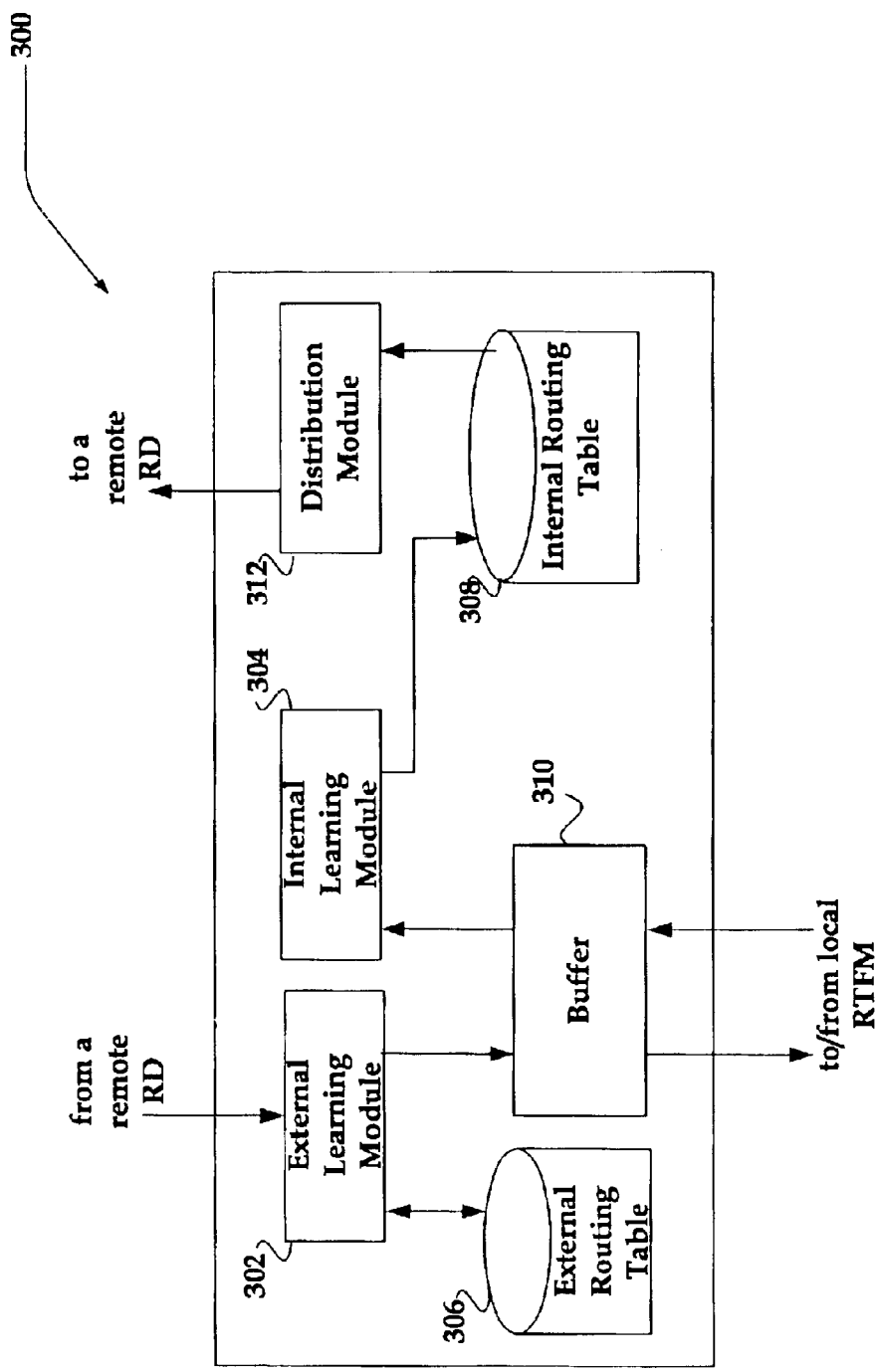
FIG. 3 is a functional block diagram of an embodiment of a Route Distributor employing components for enabling an update of a routing table in a distributed routing platform, such as shown in FIG. 1.

RDs 201–204 are described in more detail in conjunction with FIG. 3. Briefly, however, RDs 201–204 are configured to enable an exchange of route and route information between RMs 141–144 in distributed routing platform 100. RDs 201–204 facilitate a uniform perspective of the routing rules, routes, and route information independent of which RM originated the information, thereby further facilitating a scalable distributed routing architecture. Moreover, as shown in FIG. 2, RDs 201–204 are arranged to isolate RTFMs 211–214 from knowing on which node an RP resides. As such, route, and routing information associated with an RP may be made readily accessible to each RTFM across the router.

Generally, at least one RD may be designated as a master RD. The other RDs in distributed routing platform 100 are designated as slave RDs. The slave RDs are configured to communicate through the master RD. In one embodiment, an RD is designated as a standby master RD. The master RD is enabled to manage global decisions across distributed routing platform 100. For example, master RD may determine which route, routing rule, IP-flow and the like is a global best among conflicting information received from slave RDs.

The master RD is further configured to manage a "joining" and "leaving" of a slave RD to distributed routing platform 100. In one embodiment, information associated with the joining slave RD is maintained in a J-set. Information associated with the leaving slave RD is maintained in an L-set. The J-set and L-set may be a list, a database, a repository, and the like. The J-set may be employed to provide bulk update information to joined slave RDs. The L-set may be employed to enable joined slave RDs to unlearn information about left RDs.

The master RD may further maintain a receiver set, called an R-set. The R-set is configured to provide information associated with a peer RD with which the master RD communicates. The R-set may be configured based on a routing protocol type, such as BGP, RIP, and the like.

FIG. 3 is a functional block diagram of an embodiment of a Route Distributor (RD) employing components for enabling an update of a routing table in a distributed routing platform, such as shown in FIG. 1. As shown in the figure, RD 300 includes External Learning Module (ELM) 302, Internal Learning Module (ILM) 304, external routing table 306, internal routing table 308, buffer 310, and distribution module 312.

ELM 302 is in communication with external routing table 306 and buffer 310. ILM 304 is in communication with buffer 310 and internal routing table 308. Internal routing table 308 is also in communication with distribution module 312.

Buffer 310 may include volatile, removable and non-removable media, and Random Access memory (RAM), implemented in any method or technology for storage of information, such as computer readable instructions, data structures, routes, routing information, and the like. In one embodiment, buffer 310 is a First In/First Out (FIFO) memory store.

External routing table 306 includes a table structure, list, database, and the like that is configured to store routes, routing rules, routing information, and the like that is received from another RD. Internal routing table 308 a table structure, list, database, and the like that is configured to store routes, routing rules, routing information, and the like that is received from a local RTFM.

ELM 302 is configured to receive information from another RD. ELM 302 is also configured to manage the received information in external routing table 306. Moreover, ELM 302 is configured to determine a best route between two or more routes associated with virtually identical routing rules. In one embodiment, ELM 302 stores the received routes in external routing table 306 in a best route order. ELM 302 is further configured to provide route, route information, and routing rules to the local RTFM through buffer 310.

In one embodiment, ELM 302 receives route and route information from another RD by way of an inter process communications protocol, including Generic Distribution Protocol (GDP), Pipes, Dynamic Data Exchange (DDE), Sequenced Packet Exchange (SPX), Inter Applications Communications (IAC), and the like. The route and route information may be formatted in a routing packet that includes a packet header and body. The header may indicate the source RD and target RD. The body may include an entry that describes a changed route and its associated route information.

ILM 304 is configured to receive route and routing information from the local RTFM through buffer 310. In one embodiment, ILM 304 receives route and routing information from the local RTFM.

ILM 304 is further configured to determine actions associated with the received route. For example, the local RTFM may request that a notify-status operation, redistribute operation, and the like to be performed, where the operation may be an add, delete, and modify of the route and its associated route information.

ILM 304 also manages the contents of internal routing table 308 based in part on information received from the local RTFM. Moreover, ILM 304 may populate internal routing table 308 with route and route information obtained from external routing table 306. This may arise, for example, where a notify-status operation directs an addition of the best route to external routing table 308.

Distribution module 312 is configured to select a route in internal routing table 308 and distribute the route and associated route information. If the current RD is a master RD, then the distribution of the route is to slave RDs. If the current RD is a slave RD, then the distribution of the route is to the master RD(s). In one embodiment, distribution module 312 communicates the route and route information to another RD by way of an inter process communications protocol, such as GDP, DDE, SPX, IAC, and the like.

Generalized Operation

Figure 4:
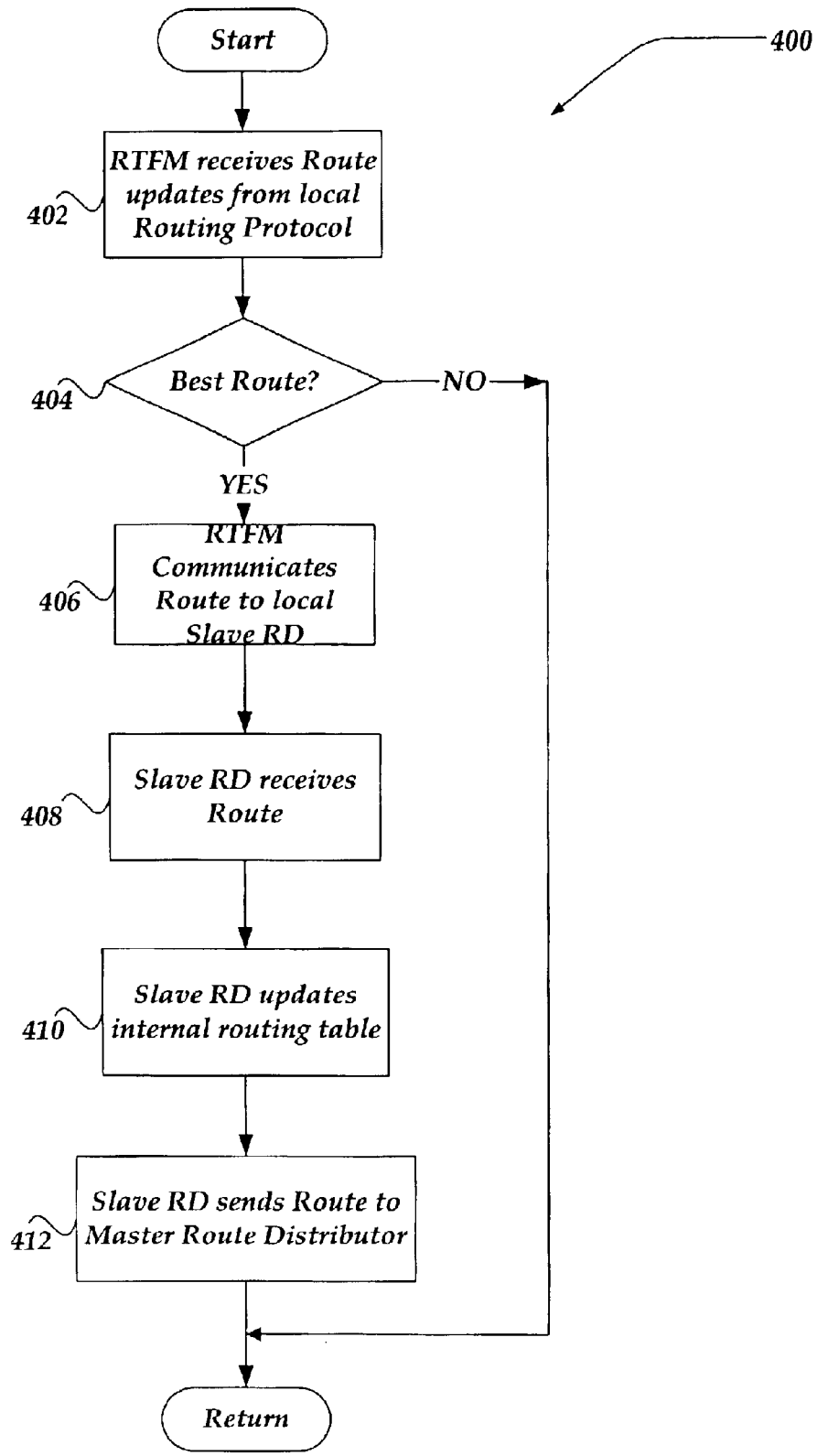
FIG. 4 is a flow diagram generally showing one embodiment for a process of distributing a local routing protocol.

The operation of certain aspects of the present invention will now be described with respect to FIGS. 4–6. FIG. 4 is a flow diagram generally showing one embodiment of a process for distributing a local routing protocol on a slave routing module.

Process 400 begins, after a start block, at block 402 where a non-master RTFM receives a route from a local routing protocol on a same node. A local routing protocol may include any of a variety of routing protocols including RIP, OSPF, ISIS, EIGRP, BGP, and the like.

Process 400 proceeds to decision block 404, where a determination is made whether the received route is a best route. A route may be determined as a best route based on a variety of considerations, including, local policies, a cost factor, shortest path, use of a preferred path, other route and route information stored in the non-master RTFM database, and the like. In any event, if, at decision block 404, it is determined that the received route is not the best route, process 400 returns to performing other actions. Alternatively, if it is determined that the received route is the best route, process 400 continues to block 406.

At block 406, the non-master RTFM redistributes the route to other local routing protocols on the local RM. In one embodiment, the non-master RTFM employs a switch tag to enable the redistribution of the route. The non-master RTFM also notifies the local routing protocol associated with the route that the route is the best route.

Process 400 continues to block 408, where a slave RD receives the route. In one embodiment, the slave RD receives the route through a Notification Change List (NCL). The process moves to block 410, where the slave RD populates its internal routing table with the route. Process 400 flows to block 412 where the slave RD sends the route to a master RD on another node. In one embodiment, the slave RD sends the route based in part on a timed update. Upon completion of block 412, process 400 returns to performing other actions.

Figure 5:
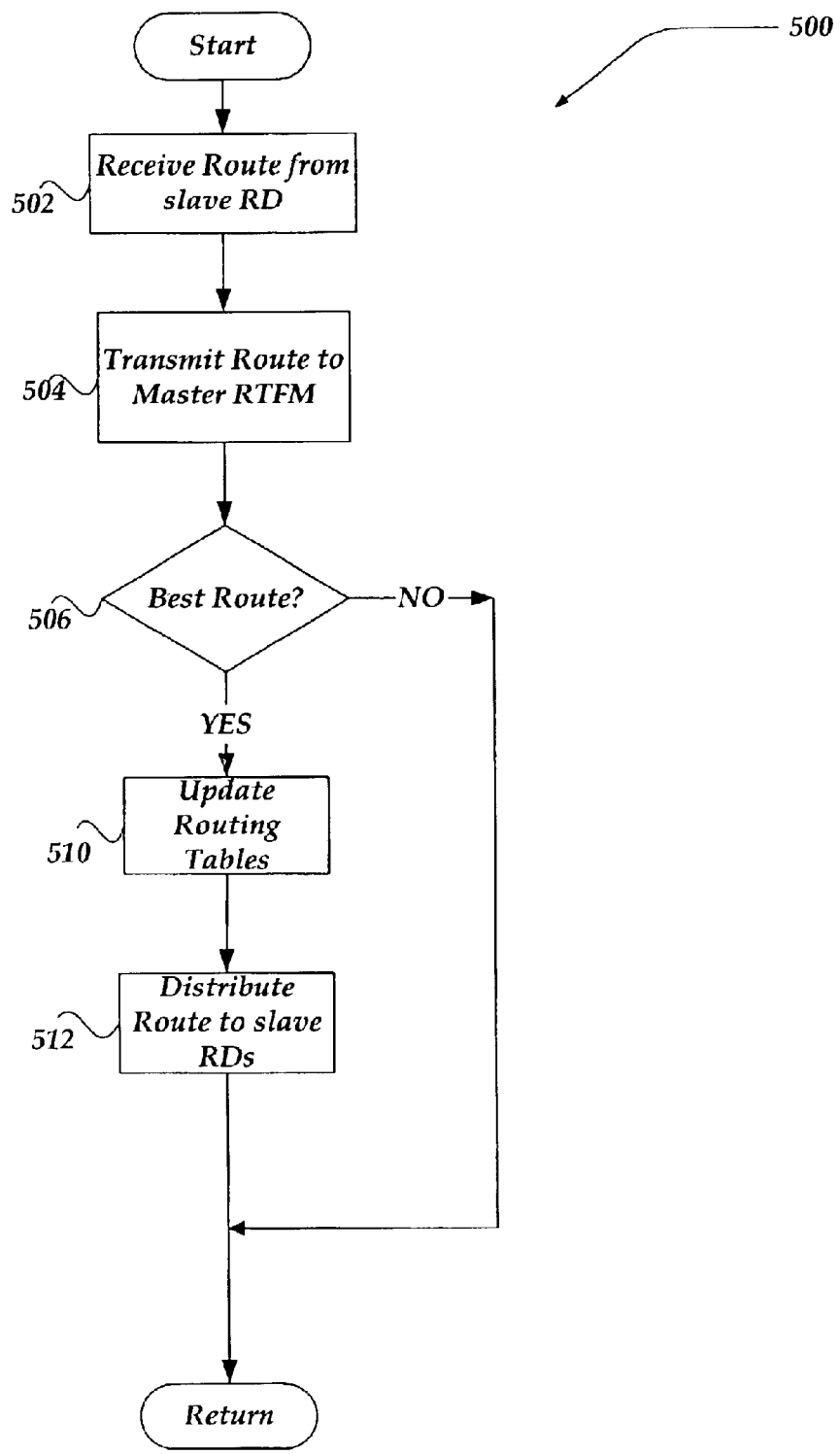
FIG. 5 is a flow diagram showing one embodiment for a process of distributing a route to a slave route distributor in a distributed routing platform.

FIG. 5 is a flow diagram showing one embodiment of a process for distributing a route to a slave RD in a distributed routing platform.

Process 500 begins, after a start block, at block 502 where a master RD receives a route from a slave RD on a remote node. The master RD updates its external routing table with the route. Moreover, the master RD associates a multi-level classification rule with the route. In one embodiment, there is a two-level classification rule that enables identification of the owner (L2) and instance (L1) of the route. The owner indicates the source RM (routing module) of the route, while the instance indicates which routing protocol added that route. For example, briefly referring to FIG. 2, a received route might have associated with it an L2=RM 142, and an L1=RP 232.

Process 500 continues to block 504 where the master RD transmits the route and associated classification rule to the master RTFM. The process proceeds to decision block 506, where a determination is made whether the received route is the best route. A route may be determined as a best route based on a variety of considerations, including, local policies, a cost factor, shortest path, use of a preferred path, other routes stored in the master RTFM database, and the like. In any event, if, at decision block 506, it is determined that the route is not the best route, process 500 returns to performing other actions. Alternatively, if it is determined that the route is the best route, process 500 continues to block 510.

The master RTFM also notifies the master RD that the route is the best route.

Process 500 continues to block 510, where based on the notification from the master RTFM, the master RD populates its internal routing table with the route and associated classification rule. The process proceeds to block 512, where the master RD distributes the route and associated classification rule to slave RDs on other nodes in the distributed routing platform. In one embodiment, the master RD distributes the route and associated classification rule through an inter process communications, such as GDP. Upon completion of block 512, process 500 returns to performing other actions.

Figure 6:
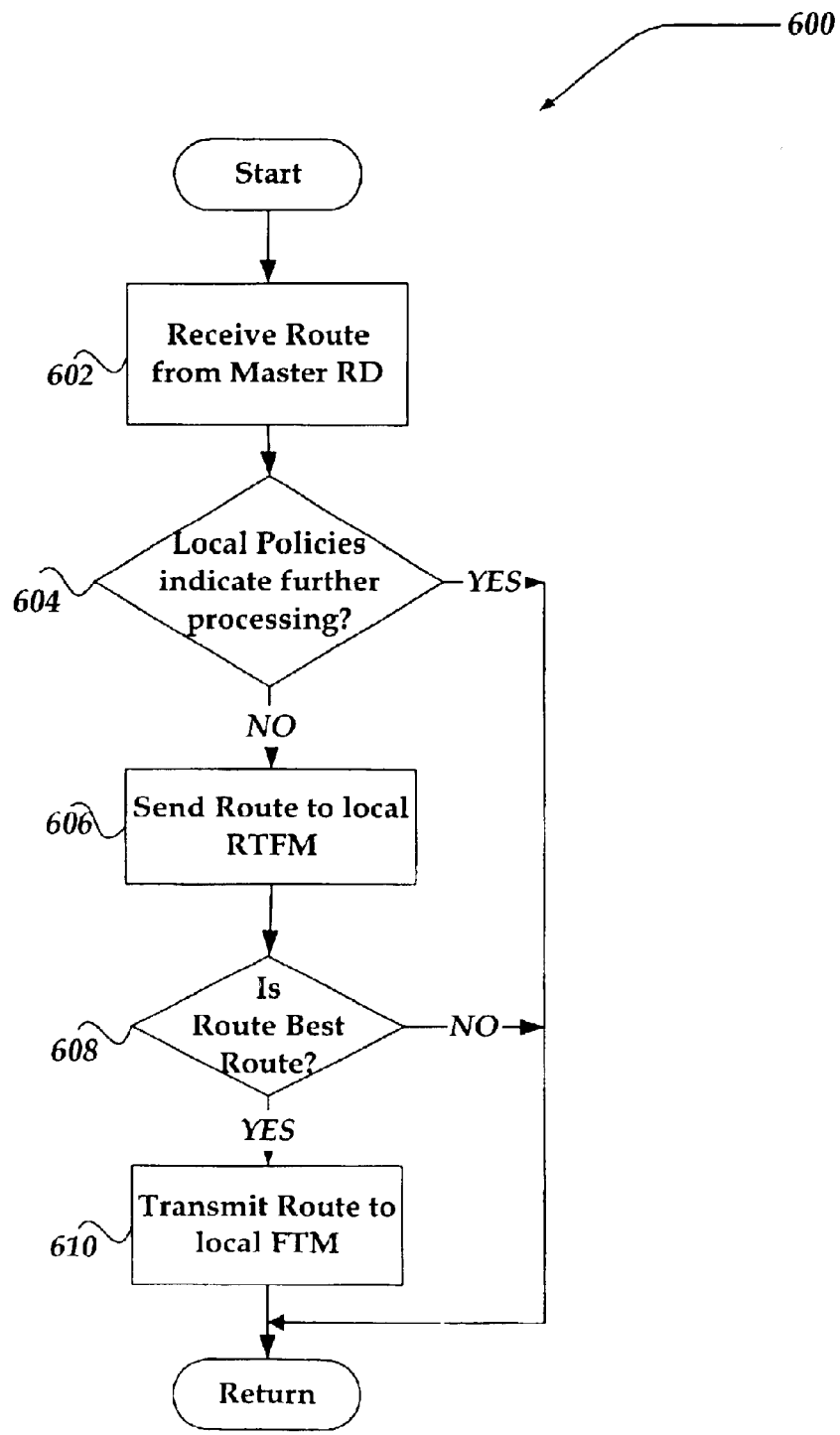
FIG. 6 is a flow diagram showing one embodiment for a process of receiving a route from a master route distributor, in accordance with aspects of the invention.

FIG. 6 is a flow diagram showing one embodiment of a process for receiving a route from a master RD.

Process 600 begins, after a start block, at block 602 where a slave RD on another node receives a route and associated classification rule from the master RD. The slave RD extracts the associated classification rule and applies local policies to determine further processing of this classification rule. Upon receipt of the route and associated classification rule, process 600 continues to decision block 604, where a determination is made whether the local policies indicate further processing. If it is determined that local policies indicate further processing, the process returns to performing other actions. Alternatively, if, at decision block 604, it is determined that the local policies do not indicate further processing, process 600 continues to block 606, where the route and associated classification rule are sent to the local RTFM.

Process 600 proceeds to decision block 608, where the local RTFM performs an analysis to determine whether the route is the best route. If, at decision block 608, it is determined that the route is not the best route, the process returns to performing other actions. Alternatively, if it is determined that the route is the best route, the process continues to block 610, where the local RTFM proceeds to transmit the route to the local FTM. Upon completion of block 610, process 600 returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by one or more processors to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for updating a routing table, comprising:
   receiving a route on a current node;
   if the route is a best route, updating a local routing table with the best route; and
   if the current node includes a master route distributor, distributing the best route associated with a classification rule to at least one remote node, wherein the remote node is enabled to update a remote routing table with the best route, and wherein the classification rule enables processing a racket based on contents of the packet; and
   if the current node includes a slave route distributor, forwarding the route to the master route distributor.

2. The method of claim 1, wherein receiving the route further comprises receiving the route from a Route Table and Flow Manager (RTFM).

3. The method of claim 1, wherein distributing the best route to at least one remote node, further comprises distributing the best route to a route distributor on the remote node.

4. The method of claim 3, wherein the route distributor is a slave route distributor.

5. The method of claim 1, wherein updating the local route table further comprises:
   if the route is received from a routing protocol on the current node, updating an internal route table; and
   if the route is received from a routing protocol on a remote node, updating an external route table.

6. The method of claim 1, further comprising is a distributed routing platform for updating the locate route table and an external route table.

7. The method of claim 1, wherein receiving the route further comprises receiving the route from a routing protocol that comprises at least one of a static routing protocol, default routing protocol, Routing Information Protocols (RIPs), Open Shortest Path First (OSPF), Enhanced Interior Gateway Routing Protocol (EIGRP), ISIS, and Border Gateway Protocol (BGP).

8. The method of claim 1, wherein the classification rule further comprises at least one of an identifier of a route owner, and an instance of a routing protocol associated with the route.

9. The method of claim 1, wherein distributing the best route further comprises distributing the best route through an inter node communication.

10. The method of claim 1, further comprising receiving a notification that the route is the best route.

11. A router, comprising:
    a slave route distributor on a first node that is configured to perform actions, including:
       receiving a route, wherein the route is associated with a local routing protocol; and
       if the route is a best route, updating a route table with the best route; and
    a master route distributor on a second node that is coupled to the first node, and configured to perform actions, including:
       receiving the route from the slave route distributor; and
       distributing the route associated with a classification rule to another slave route distributor, wherein the other slave route distributor is configured to update another route table, and the classification rule enables processing a packet based on contents of the packet.

12. The router of claim 11, wherein the slave route distributor, master route distributor, and other slave route distributor each reside on a different node in a distributed routing platform.

13. The router of claim 11, wherein the node further comprises at least one of a transport service module, a control processor, and a routing engine.

14. The router of claim 11, wherein updating the route table further comprises updating an internal route table.

15. The router of claim 11, wherein updating another route table further comprises updating an external route table.

16. The router of claim 11, wherein the router is a distributed routing platform.

17. The router of claim 11, wherein the local routing protocol further comprises at least one of a static routing protocol, default routing protocol, Routing Information Protocols (RIPs), Open Shortest Path First (OSPF), Enhanced Interior Gateway Routing Protocol (EIGRP),ISIS, and Border Gateway Protocol (BGP).

18. The router of claim 11, wherein the classification rule further comprises at least one of an identifier of a route owner, and an instance of the local routing protocol associated with the route.

19. The router of claim 11, wherein the master route distributor is configured to perform further actions, including:

managing a join of a slave route distributor to the router; and managing a leave of a slave route distributor to the router.

20. An apparatus, comprising:

a route table and flow manager on a first node that is configured to perform actions, including:

receiving a route;

determining if the route is a best route, and if the route is the best route, updating a first route table with the best route; and a route distributor on the first node that is coupled to the route table and flow manager, and is configured to perform actions, including:

receiving the route from the route table and flow manager; and if the route distributor is a master route distributor, distributing the best route associated with a classification rule to a slave route distributor on a second node, wherein the slave route distributor is enabled to update a second route table with the best route, and the classification rule enables processing a packet based on contents of the packet.

21. The apparatus of claim 20, wherein the first and second nodes further comprises at least one of a transport service module, a control processor, and a routing engine.

22. The apparatus of claim 20, wherein updating the first route table further comprises updating an internal route table.

23. The apparatus of claim 20, wherein updating the second route table further comprises updating an external route table.

24. The apparatus of claim 20, wherein receiving the route further comprises receiving the route from at least one of a static routing protocol, default routing protocol, Routing Information Protocols (RIPs), Open Shortest Path First (OSPF), Enhanced Interior Gateway Routing Protocol (EIGRP), ISIS, and Border Gateway Protocol (BGP).

25. The apparatus of claim 20, wherein the classification rule further comprises at least one of an identifier of a route owner, and an instance of a routing protocol associated with the route.

* * * * *

UNITED STATES PATENT AND TRADEMARK OFFICE
CERTIFICATE OF CORRECTION

PATENT NO. : 6,850,492 B2  
DATED : February 1, 2005  
INVENTOR(S) : Vijay K. Chander et al.

It is certified that error appears in the above-identified patent and that said Letters Patent is hereby corrected as shown below:

Column 9,
Line 61, delete "racket" and insert -- packet --.

Signed and Sealed this

Twenty-eighth Day of June, 2005

JON W. DUDAS  
*Director of the United States Patent and Trademark Office*